(No Model.) 3 Sheets—Sheet 1.
W. H. BARNARD & C. E. BENEDICT.
ORANGE PEEL SEPARATING AND SHREDDING MACHINE.
No. 349,075. Patented Sept. 14, 1886.
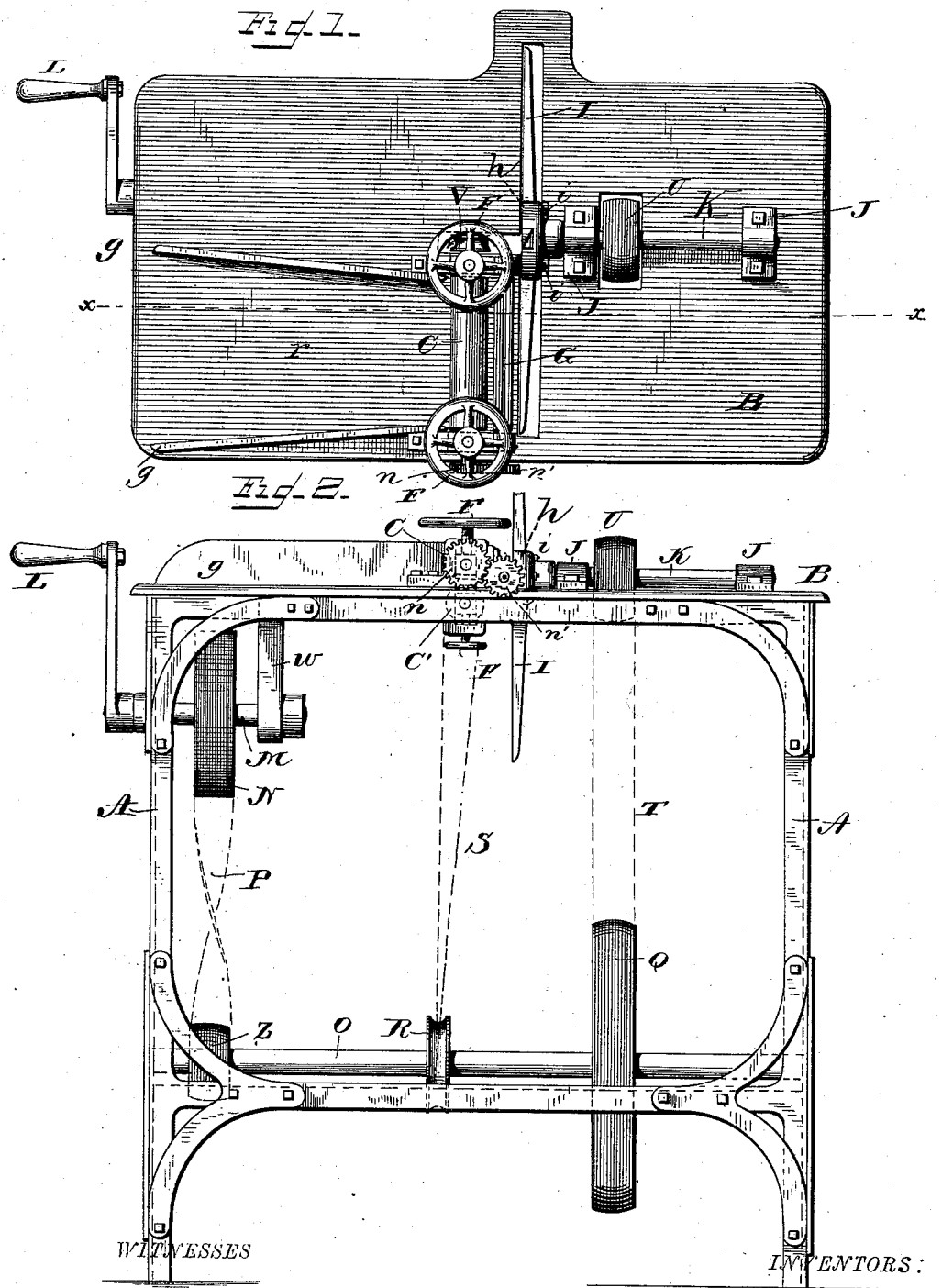

(No Model.) 3 Sheets—Sheet 2.
W. H. BARNARD & C. E. BENEDICT.
ORANGE PEEL SEPARATING AND SHREDDING MACHINE.
No. 349,075. Patented Sept. 14, 1886.
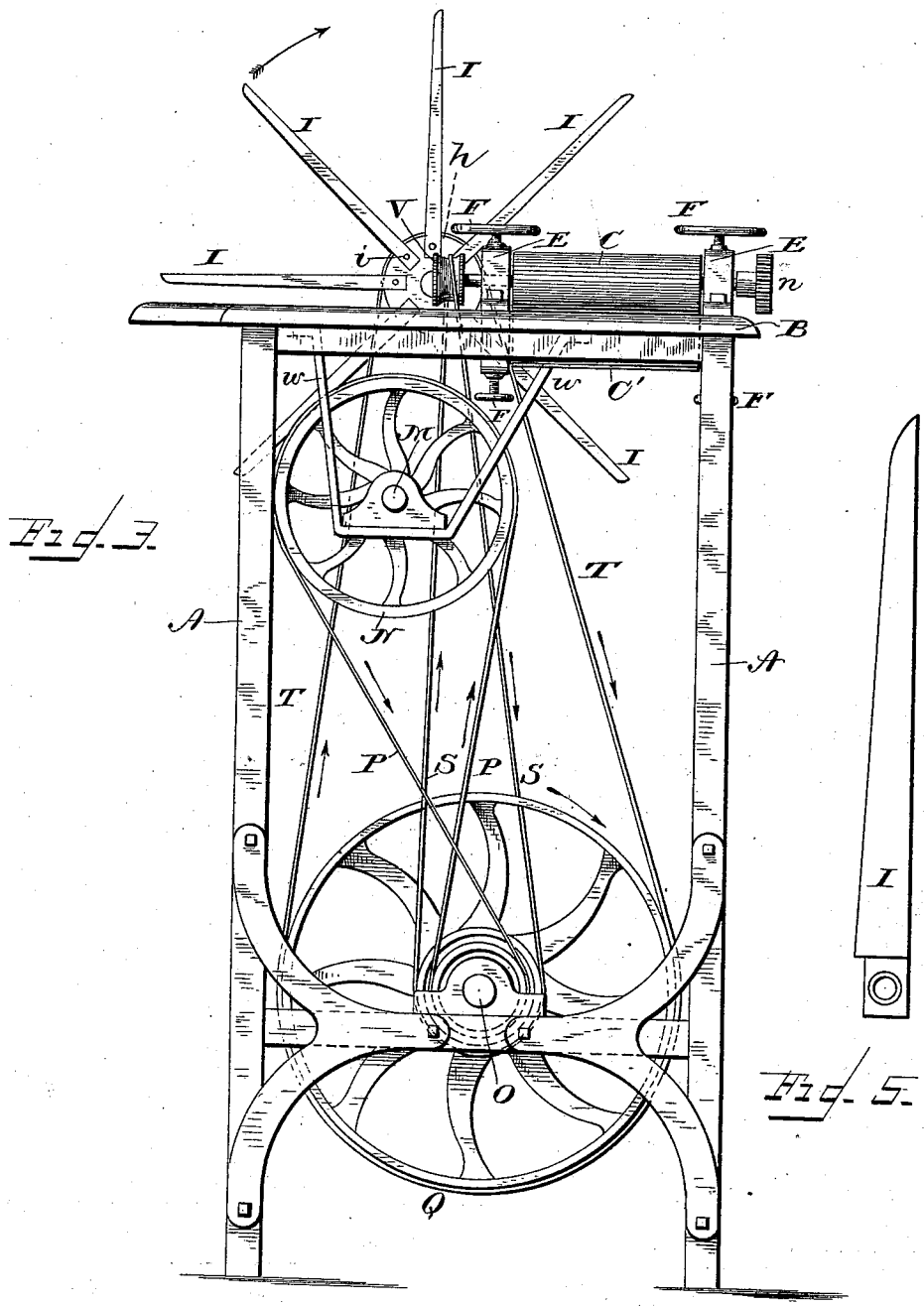
WITNESSES
F. L. Ourand
Robt F. McMillan
INVENTORS:
William H. Barnard
Charles E. Benedict
per R. G. Dubois & Co
Their Attorneys

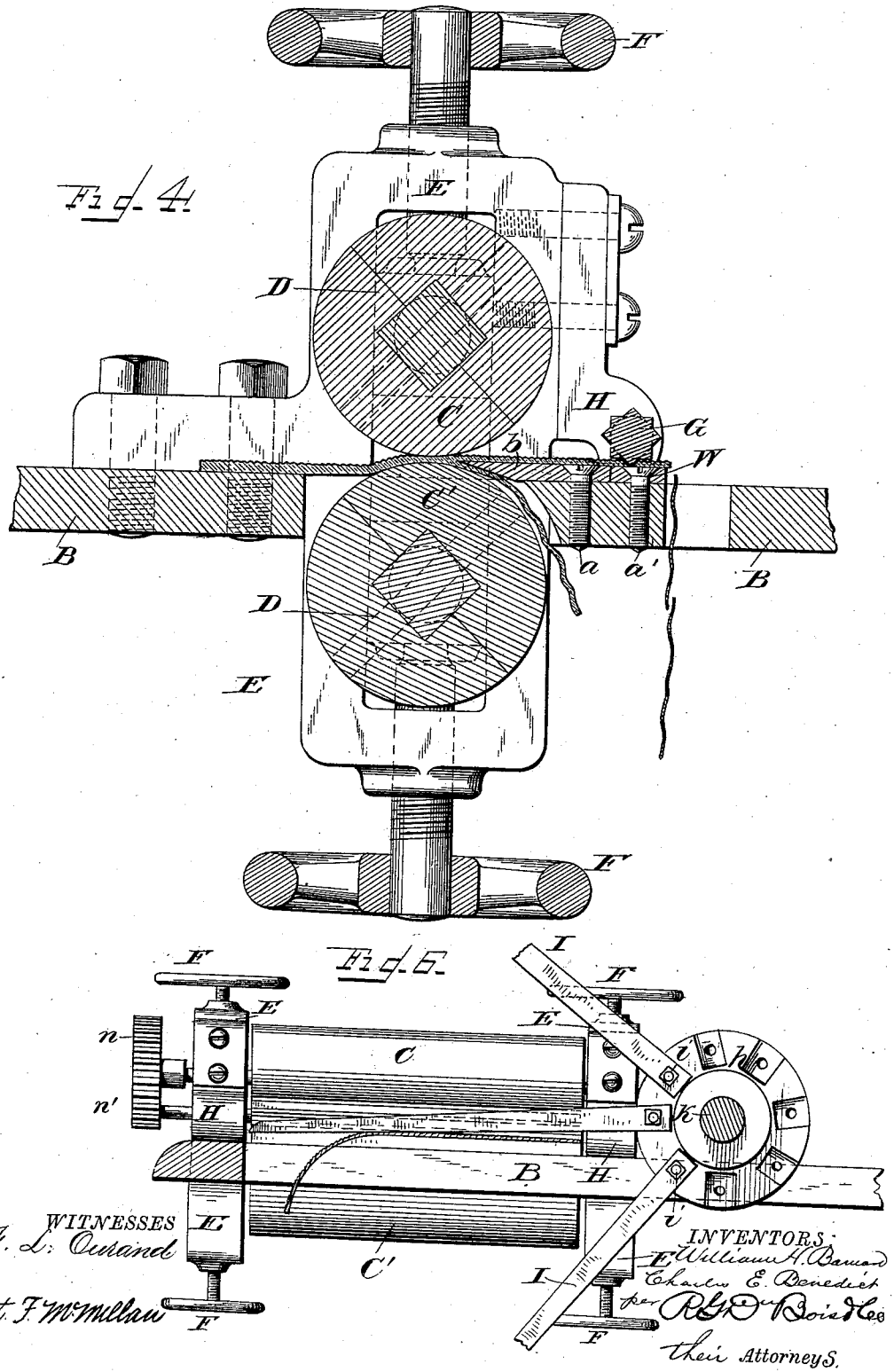

UNITED STATES PATENT OFFICE.

WILLIAM H. BARNARD AND CHARLES E. BENEDICT, OF LOS ANGELES, CAL.

ORANGE-PEEL SEPARATING AND SHREDDING MACHINE.

SPECIFICATION forming part of Letters Patent No. 349,075, dated September 14, 1886.

Application filed May 27, 1886. Serial No. 203,389. (No model.)

*To all whom it may concern:*

Be it known that we, WILLIAM H. BARNARD and CHARLES E. BENEDICT, citizens of the United States, residing at Los Angeles, in the county of Los Angeles and State of California, have invented certain new and useful Improvements in Orange-Peel Separating and Shredding Machines; and we do hereby declare the following to be a full, clear, and exact description of the invention, such as will enable others skilled in the art to which it appertains to make and use the same.

In the manufacture of marmalade and other preserves from oranges and kindred fruits, the peel after being removed has generally been thrown away and wasted. This is due to the fact that the peel is mostly composed of a bitter and unwholesome lining or pithy portion. The exterior coating of the peel, when properly treated, is nutritious and healthful and can be used as a valuable ingredient for marmalade and other preserves; but as it is integral with the bitter inside lining and will not peel from the same the expense of separating it by hand and reducing it to shreds has heretofore been too great to make the operation profitable.

The object of our invention is to provide a machine for accomplishing this purpose whereby the nutritious portion of the orange-peel can be separated and reduced to shreds with facility and profit; and to this end our invention consists in the combination of a stand having feeding-rollers mounted thereon, one of which is provided with a pulley, an auxiliary roller, gearing intermediate the main feeding-rollers and the auxiliary roller, a separating-knife, a rotary cutter having its axis at right angles to the axes of said feeding-rollers and mounted upon an arbor provided with a pulley, a lower shaft provided with pulleys, a crank-shaft carrying a pulley, and intermediate bands operating over said pulleys, all arranged and adapted to operate in the manner and for the purpose more fully described hereinafter, and pointed out in the claim.

Figure 1 is a top view of our complete machine; Fig. 2, a side elevation; Fig. 3, an end elevation; Fig. 4, a detail view of the feeding-rollers in cross-section through line X X of Fig. 1, illustrating a piece of peel passing between the rollers and the knife separating the pithy portion, and Fig. 5 a view of one of the blades of the rotary cutter detached from the cutter-head; Fig. 6, a detail view illustrating the knives in the act of shredding an orange-peel.

Like letters represent like parts throughout the several views.

To construct our machine, we provide a stand or frame, A, having a top, B, upon which is mounted a pair of rollers, C C'. These rollers are provided with adjustable bearings D, confined within housings E, and adjusted by means of set-screws F.

$b$ is a separating-knife secured to the top of the stand by means of screws $a$, and having its cutting-edge placed just in front of the adjacent portion of the peripheries of the feeding-rollers C and C'. Just in front of said rollers C C' there is an auxiliary feeding-roller, G, having a corrugated or toothed surface. Said roller is mounted in stationary bearings H, attached to housings E. A rotary cutter consisting of a cutter-head, $h$, provided with radial cutting-blades I, is keyed to the end of arbor K, journaled in stationary bearings J, secured to the top of the stand. The radial blades I are separate and independent of each other, and are removably secured at one end only to the cutter-head $h$ by means of bolts $i$, their free ends being made to taper like the ordinary scissors-blade. Said rotary cutter is arranged to revolve in a direction at right angles to the axes of the feeding-rollers C, C', and G, as shown by arrows in Fig. 3.

The whole mechanism is operated by means of a hand-crank, L, attached to a shaft, M, journaled in hangers $w$, and carrying a pulley, N, which imparts motion to a main horizontal shaft, O, by means of a cross-belt, P, operating over pulley Z. Said main shaft O is provided with a grooved pulley, R, and another larger pulley, Q. The grooved pulley R communicates motion to the feeding-rollers C C' through the medium of endless belt S, passing over another grooved pulley, V, upon the end of the feeding-roller C. The larger pulley, Q, communicates motion to the rotary cutter through the medium of another endless belt working over pulley U, keyed to shaft K.

W is a metal knife-plate, which is secured to the top of the stand alongside the separating-blade by means of the screws $a'$. This plate has a sharp corner with which the edges of the revolving knives are adapted to come in frictional contact in the operation of cutting the peel into shreds.

It is not essential that the knife-plate be made independent of the separating-blade, as the body of the latter could be extended back and made to serve the same purpose.

The roller C is provided with a gear-wheel, $n$, which operates the auxiliary feeding-roller G by meshing with a smaller gear-wheel, $n'$, upon the end thereof.

Guides $g\ g$ upon the top of the stand form a feeding-trough, $r$, for the reception of the orange-peel.

In operating our machine the crank L is turned to the left, and the cross belt P, working over pulleys N Z, turns the shaft O to the right and revolves the cutting-blades in the same direction through the medium of belt T operating over pulley Q and U. The orange-rind is placed with its pithy side down in the trough $r$, and is fed flatwise to the feeding-rollers C C', between which it passes, and as it emerges upon the opposite side from between the rollers it comes in contact with the sharp edge of the horizontal separating-knife, which removes the pithy part from the upper coating. Said coating is then carried forward by the assistance of the auxiliary roller G to the revolving knives I, which reduce it to shreds, as shown in Figs. 4 and 6.

It is evident that the details of construction of our device can be varied in many ways which might suggest themselves to a skilled mechanic. Therefore we do not limit ourselves to the precise construction herein shown, but feel entitled to such variations as come within the scope of our invention.

We do not herein broadly claim the feeding-rollers in combination with a separating-knife and rotary cutter; but

What we claim as new, and desire to secure by Letters Patent, is—

In a peel separating and shredding machine, the combination of a stand, A, having feeding-rollers mounted thereon, one of which is provided with a pulley, an auxiliary roller, G, gearing intermediate the main feeding-rollers and the auxiliary roller, a separating-knife, $b$, a rotary cutter having its axis at right angles to the axes of said feeding-rollers, and mounted upon an arbor, K, provided with a pulley, U, a lower shaft, O, provided with pulleys Q, R, and Z, crank-shaft M, carrying a pulley, N, and intermediate bands, P, S, and T, all arranged and adapted to operate substantially as described.

In testimony whereof we affix our signatures in presence of two witnesses.

WILLIAM H. BARNARD.
CHARLES E. BENEDICT.

Witnesses:
VERNON LONG,
S. G. PIERCE.